United States Patent [19]

Little et al.

[11] Patent Number: 4,807,976
[45] Date of Patent: Feb. 28, 1989

[54] LIGHT VALVE SYSTEM AND METHOD WITH PULSED READOUT

[75] Inventors: Michael J. Little, Woodland Hills; Uzi Efron, Los Angeles; Paul O. Braatz, Canoga Park; Robert N. Schwartz, Westlake Village; Yuri Owechko, Newbury Park; Murray S. Welkowsky, Chatsworth, all of Calif.

[73] Assignee: Hughes Aircraft Company, Los Angeles, Calif.

[21] Appl. No.: 33,319

[22] Filed: Apr. 1, 1987

[51] Int. Cl.⁴ .......................... G02F 1/135; G02F 1/01
[52] U.S. Cl. ..................................... 350/355; 350/342
[58] Field of Search ............... 350/355, 356, 342, 392, 350/386

[56] References Cited

U.S. PATENT DOCUMENTS

| | | | |
|---|---|---|---|
| 3,798,452 | 3/1974 | Spitz et al. | 350/342 |
| 3,824,002 | 7/1974 | Beard. | |
| 4,019,807 | 4/1977 | Boswell et al.. | |
| 4,114,991 | 9/1978 | Bleha et al.. | |
| 4,191,452 | 3/1980 | Grinberg et al.. | |
| 4,191,454 | 3/1980 | Braatz et al. | 350/342 |
| 4,228,449 | 10/1980 | Braatz. | |
| 4,239,348 | 12/1980 | Grinberg et al.. | |
| 4,443,064 | 4/1984 | Grinberg et al.. | |

OTHER PUBLICATIONS

Braatz, P. O., K. Chow, U. Efron, N. Goodwin, J. Grinberg, M. J. Little, and G. Nash, "A New Electrical to Optics Image Converter—The CCD Liquid Crystal Light Valve", 1980 *Biennal Display Research Conference*, Oct. 1980, pp. 93–98.

J. Grinberg et al; "A New Real-Time Non-Coherent to Coherent Light Image Converter—The Hybrid Field Effect Liquid Crystal Light Valve", Optical Engineering 14, pp. 217–225, May–Jun. 1975.

J. Grinberg et al, "Photoactivated Birefringent Liquid Crystal Light Valve for Color Symbology Display", IEEE Transactions Electronic Devices ED-22, 775–783, No. 9, Sep. 1975.

U. Efron et al, "The Silicon Liquid-Crystal Light Valve", Journal of Applied Physics, Feb. 15, 1985, vol. 57, No. 4, pp. 1356–1368.

U. Efron et al, "Silicon Liquid Crystal Light Valves", Status and Issues, Optical Engineering, vol. 22, No. 6, Nov./Dec 1983, pp. 682–686.

U. Efron et al, "The LC-Based Visible to IR Dynamic Image Converter (VIDIC)", Proc. SPIE, 465, pp. 181–191, 1984.

*Primary Examiner*—Eugene R. LaRoche
*Assistant Examiner*—Nathan W. McCutheon
*Attorney, Agent, or Firm*—V. D. Duraiswamy; A. W. Karambelas

[57] ABSTRACT

A pulsed readout technique is described for liquid crystal light valves which eliminates the problem of readout beam leakage through the light valve mirror. The readout beam is pulsed on only when the light valve's semiconductor layer is out of a depletion state. This can occur during an accumulation state or, in certain applications, during a specially inserted quiescent period in the light valve voltage cycle. The invention is applicable to light valves with various types of modulating inputs, and can be used with either dielectric or metal matrix mirrors.

30 Claims, 10 Drawing Sheets

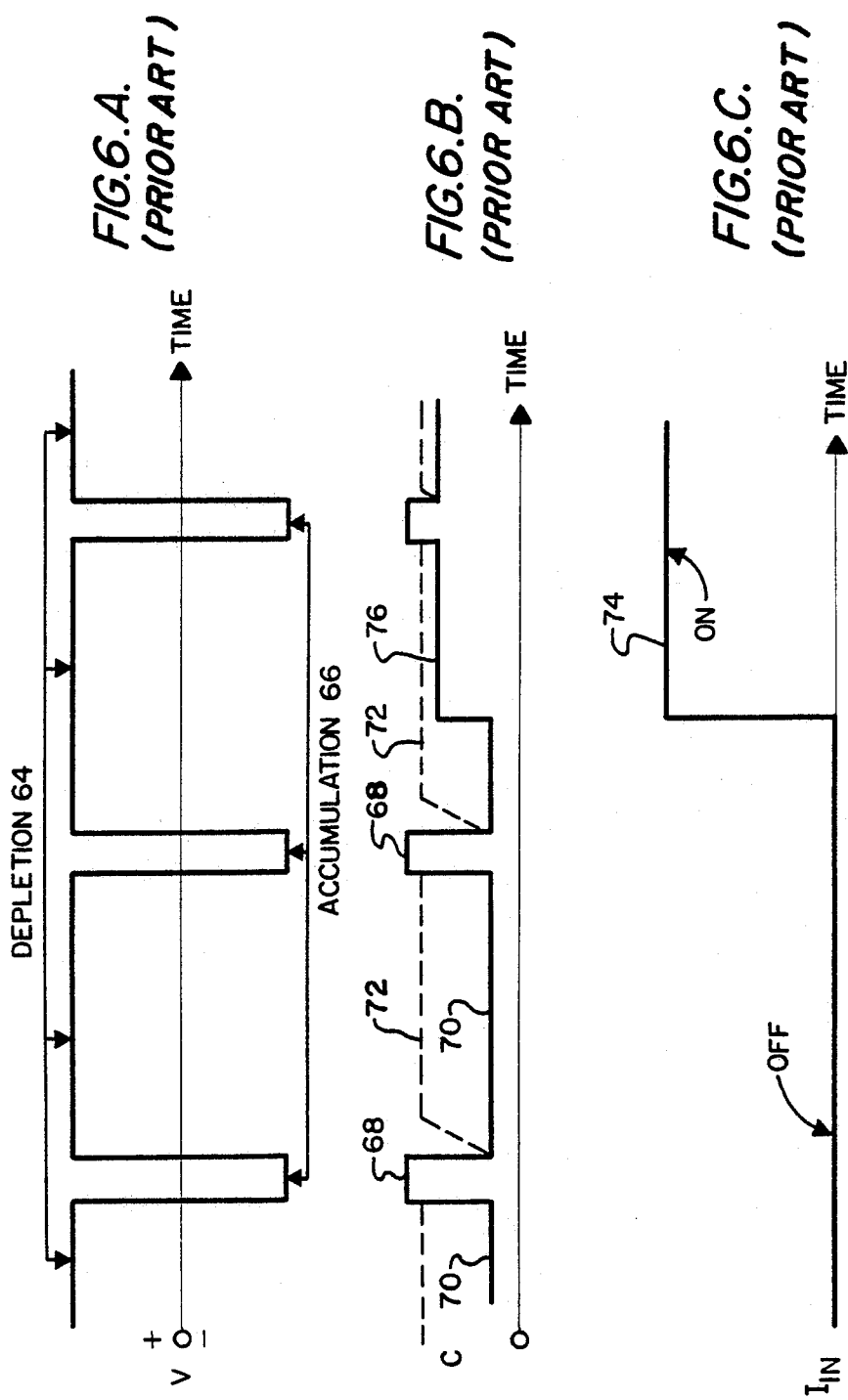

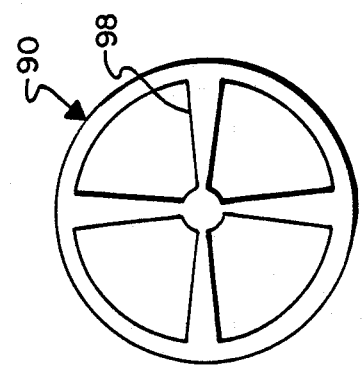
FIG.10.
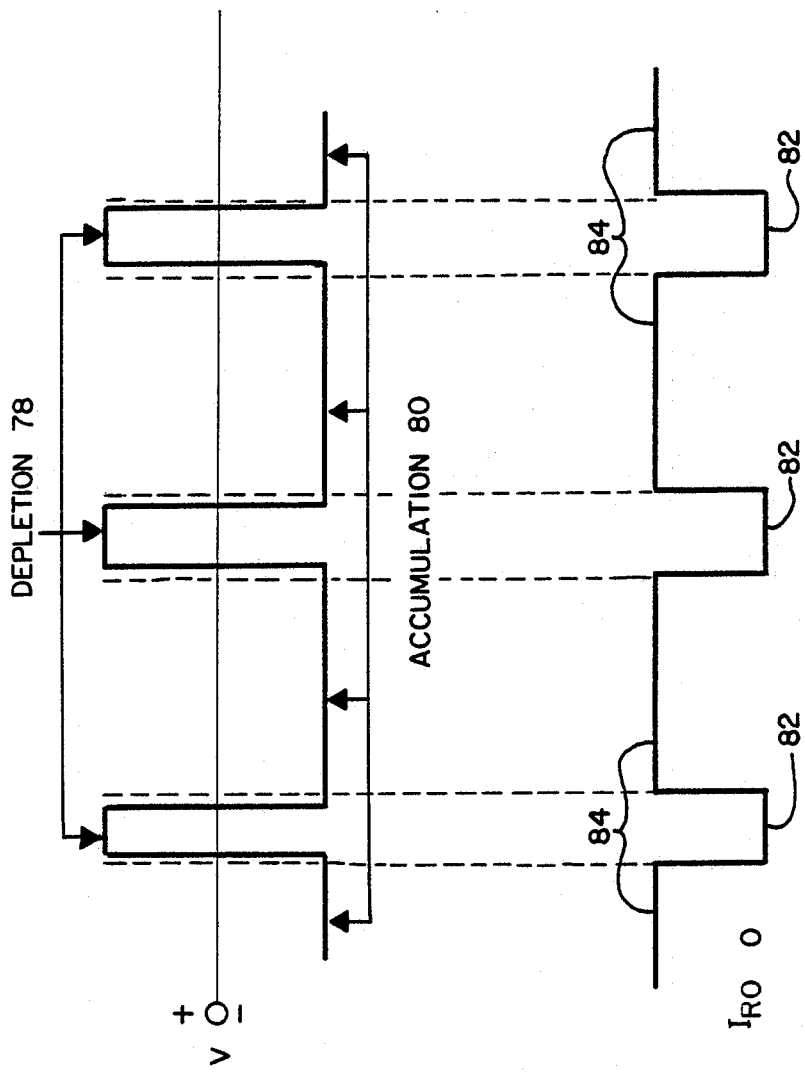
FIG.7A.
FIG.7B

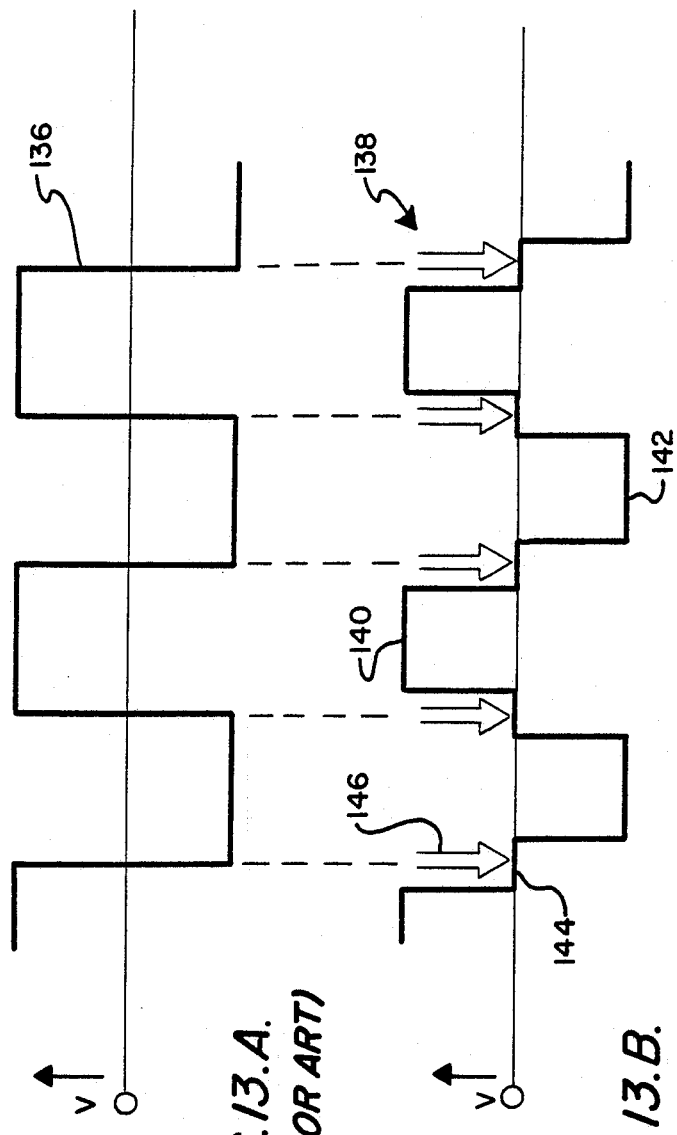
FIG.13.A.
(PRIOR ART)
FIG.13.B.

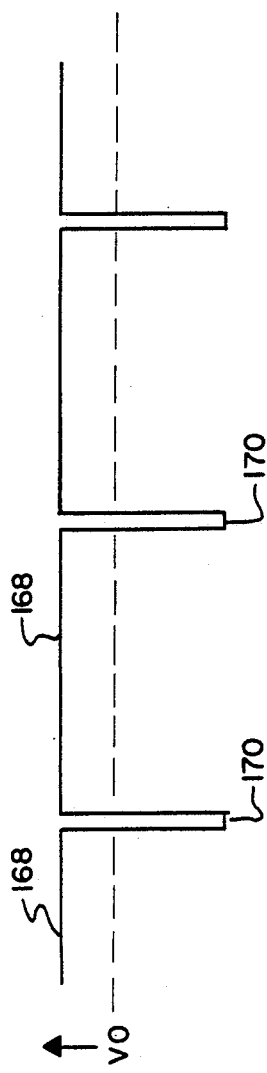
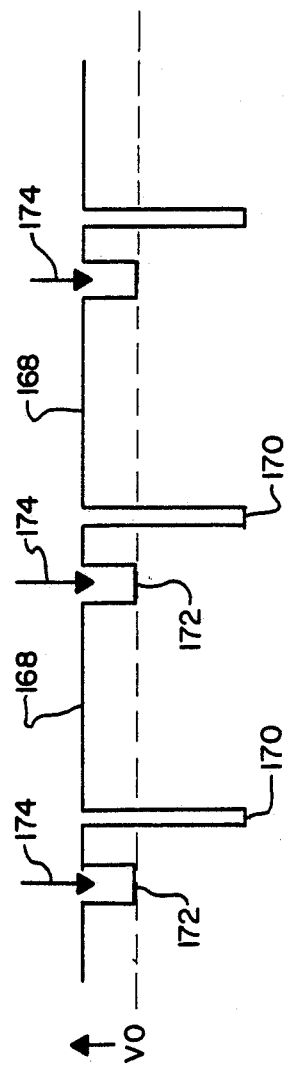
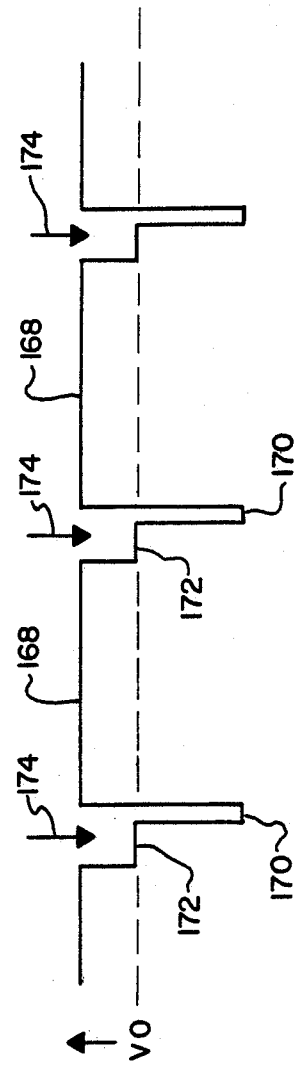
FIG.15.A.   FIG.15.B.   FIG.15.C.

LIGHT VALVE SYSTEM AND METHOD WITH PULSED READOUT

BACKGROUND OF THE INVENTION

1. Field of the Invention

This invention relates to a light valve system and method for spatially modulating a readout beam in response to an applied input signal, and more particularly to light valves in which the readout beam is coordinated with the operation of the light valve to enhance its performance.

2. Description of the Related Art

Light valves, generally employing liquid crystals as an electro-optic medium, are used to spatially modulate a readout beam in accordance with an input signal pattern applied to the light valve. They can be used to greatly amplify the input pattern by controlling a readout beam of much greater intensity, to convert spatially modulated incoherent input radiation to a coherent readout laser beam with a similar spatial modulation, for optical data processing, wavelength conversion, or for other purposes that involve the conversion of an input signal pattern to a corresponding spatial modulation on a separate readout beam. The input signal may take the form of a spatially modulated optical input beam, a voltage pattern applied to a CCD array on the light valve, or a scanning electron beam; other means of inputs might also be visualized.

The main parameters of light valves are the input sensitivity, output, and resolution modulation (contrast ratio), as well as output uniformity and frame rate. While high contrast, moderate brightness and color capability are required for command and control displays, very high brightness and resolution, as well as fast response, are required for flight-simulation applications. Optical data processing applications require low wavefront distortion (output uniformity) and high diffraction efficiency. In addition, for real-time portable scene correlators, high frame rate, wide spectral range, small size, and low power consumption are also required. Most of these requirements are met by a cadmium sulfide liquid crystal light valve developed by Hughes Aircraft Company. This device is described in articles by J. Grinberg, A. Jacobson, W. P. Bleha, L. Miller, L. Fraas, D. Boswell and G. Myer, "A New Real-Time Non-Coherent to Coherent Light Image Converter—The Hybrid Field Effect Liquid Crystal Light Valve", Optical Engineering 14, 217 (1975), and J. Grinberg, W. P. Bleha, A. Jacobson, A. M. Lackner, G. Myer, L. Miller, J. Margerum, L. Fraas and D. Boswell, "Photoactivated Birefringent Light-Crystal Light Valve for Color Symbology Display", IEEE Transactions Electronic Devices ED-22, 775 (1975).

The main drawback of the CdS-based light valve has been its slow response time. A second generation, silicon-based liquid crystal light valve has been developed which retains the advantages of the CdS-based light valve and has a considerably faster response time. The silicon-based device is described in an article by U. Efron, J. Grinberg, P. 0. Braatz, M. J. Little, P. G. Reif and R. N. Schwartz, "The Silicon-Liquid Crystal Light Valve", Journal of Applied Physics 57(4) 1356-68 (1985). This article also summarizes some of the prior light valve efforts.

A simplified block diagram of a typical photoactivated light valve system is illustrated in FIG. 1. An input beam 2 is developed from a source such as the screen of a cathode ray tube 4 and imaged through lens 6 onto the input side of a light valve 8. On the other side of the light valve a readout beam 10 is generated by a laser 12, and directed onto the readout side of the light valve by a polarizing beam splitter 14. The input beam 2 establishes a spatial polarization of a liquid crystal layer within the light valve 8, and this layer controls the retro-reflection of the readout beam from the light valve. The portions of the readout beam which are incident upon locations in the liquid crystal layer wherein the liquid crystal molecules have been rotated in response to the voltage generated by the input radiation are retro-reflected back through beam splitter 14 to emerge as an out beam 16. In this example, the liquid crystal in the light valve modulates the spatial intensity of the readout beam into a corresponding but amplified intensity pattern of the input beam.

The internal construction of a silicon-based liquid crystal light valve which is suitable for this purpose is shown in FIG. 2. An input image beam on the right hand side of the device is identified by reference numeral 18, while a readout beam 20 is directed onto, and reflected from, the left hand side of the device. A layer of high resistivity silicon photoconductor 22 has a thin p. back contact layer 24 formed on its input side. This back contact provides a high sheet conductivity to present a very small load at any point in the device's cross-section where carriers are generated. It also attains a linear operation of the device, avoiding a situation in which the sensitivity and resolution are dependent upon the input light level, and also provides higher output uniformity under dark conditions. An SiO: oxide layer 26 is provided on the input side of back contact 24, with a fiber optic plate 28 adhered to the oxide layer by means of an optical cement 30. A DC-biased n-type diode guard ring 32 is implanted at the opposite edge of the silicon photoconductor wafer 22 from back contact 24 to prevent peripheral minority carrier injection into the active region of the device. An $SiO_2$ gate insulator layer 34 is formed on the readout side of the silicon photoconductor wafer 22. Isolated potential wells are created at the $Si/SiO_2$ interface by means of an n-type microdiode array 36. This prevents the lateral spread of signal electrons residing at the interface.

A unified thin film dielectric mirror 38 is located on the readout side of the gate oxide layer 34 to provide broad-band reflectivity, as well as optical isolation to block the high intensity readout beam from the photoconductor. A thin film of fast response liquid crystal 40 is employed as the light modulating electro-optic layer on the readout side of mirror 38. A front glass plate 42 is coated with an indium tin oxide (ITO) counterelectrode 44 adjacent the liquid crystal. The front of glass plate 40 is coated with an anti-reflection coating 46, and the whole structure is assembled within an airtight anodized aluminum holder.

Silicon photoconductor 22 is coupled with oxide layer 34 and transparent metallic electrode coating 44 to form an MOS structure. The combination of the insulating liquid crystal, oxide and mirror act as the insulating gate of the MOS structure.

In operation, an alternating voltage source 48 is connected on one side to back contact 24 by means of an aluminum back contact pad 50, and on its opposite side to counterelectrode 44. The voltage across the two electrodes causes the MOS structure to operate in alternate depletion (active) and accumulation (inactive) phases. In the depletion phase, the high resistivity silicon photoconductive layer 22 is depleted and electron-hole pairs generated by input light beam 18 are swept by the electric field in the photoconductor, thereby producing a signal current that activates the liquid crystal. The electric field existing in the depletion region acts to sweep the signal charges from the input side to the readout side, and thus preserve the spatial resolution of the input image. The polarized readout beam 20 enters the readout side of the light valve through glass layer 42, passes through the liquid crystal layer, and is retro-reflected by dielectric mirror 38 back through the liquid crystal. Since the conductivity of each pixel in photoconductive layer 22 varies with the intensity of input beam 18 at that pixel, a voltage divider effect results which varies the voltage across the corresponding pixel of the liquid crystal in accordance with the spatial intensity of the input light. As is well known, the liquid crystals at any location will orient themselves in accordance with the impressed voltage, and the liquid crystal orientation relative to the readout light polarization at any particular location will determine the amount of readout light that will be reflected back off the light valve at that location. Thus, the spatial intensity pattern of the input light is transferred to a spatial liquid crystal orientation pattern in the liquid crystal layer, which in turn controls the spatial reflectivity of the light valve to the readout beam.

One branch in the development of liquid crystal light valves is the charge-coupled device light valve (CCD-LCLV). This type of device has applications mainly in optical data processing as an electronically addressed optical light modulator for spectrum analysis, image correction, radar, and spread-spectrum signal processing. The general structure and operation of such devices is described in an article by Uzi Efron et al., "Silicon Liquid Crystal Light Valves: Status and Issues:", *Optical Engineering*, Vol. 22, No. 6, Nov./Dec. 1983, pages 682–686.

For both photoactivated and CCD addressed light valves, an important function of the dielectric mirror 38 is to block readout light and prevent it from activating the photoconductor substrate 22. The intensity of the readout beam may be in the order of $10^6$–$10^8$ times the input beam intensity. During the active (depletion) phase of light valve operation, minority carriers are transported from the back face of the photoconductor layer to the readout face adjacent the dielectric mirror. It is this accumulation of a small quantity of spatially resolved carriers at the readout face that produces a voltage pattern for activating the liquid crystal layer. Since the photoconductor layer 22 is photosensitive, a dielectric mirror/light blocking layer 38 is required that will prevent the high intensity readout light from generating spatially unresolved carriers in the photoconductor that would otherwise swamp the signal charge. Typically, the dielectric mirror/light blocking layer 38 must attenuate the readout beam by a factor of about $10^6$ or larger, so that the number of carriers accumulated during the active phase due to light leakage through the dielectric mirror/light blocking layer does not approach or exceed the signal charge. It is quite difficult to fabricate a dielectric mirror with this capability. Although an attenuation of $10^7$ has been achieved, some applications require greater attenuations, for which adequate dielectric mirrors are not presently available.

As a possible substitute for a dielectric mirror, a recently developed metal matrix mirror has been demonstrated to provide excellent electrical and optical properties for valves operating in the infrared region. This type of mirror is described in the co-pending U.S. patent application Ser. No. 759,004, "Reflective Matrix Mirror Visible to Infrared Convertor Light Valve" by P. O. Braatz, and assigned to Hughes Aircraft Company.

A metal matrix mirror is illustrated in FIG. 3. A matrix of reflective islands 52 is formed on an insulative layer 54 such as $SiO_2$. The islands 52 are separated from each other so as to avoid short-circuits across the face of the mirror. The dimensions of the individual islands 52 are determined from a minimum size for adequate reflection, on the order of 5–20 microns, and the resolution or pixel element size for which the light valve is designed. The thickness of the islands depends upon the specific reflective material employed. There is a basic requirement that the free electron density of the reflective material be sufficient to interact with the readout radiation and scatter it back out of the material. Metals such as aluminum or silver or metal/semiconductor compounds such as platinum-silicide may be used.

The useful range of light valves employing metal matrix mirrors has been limited principally to infrared radiation because of the bandgap of the silicon substrate. In the visible region, visible readout light leaks through the vacant channels separating the metal islands, causing activation of the underlying photoconductor. Since only about 70% of the readout surface is occupied by the reflective islands 52, enough light leaks through between the islands to effectively prevent operation in the visible region. Thus, significant limitations are encountered with both dielectric and metal matrix mirrors.

SUMMARY OF THE INVENTION

In view of the above problems, the purpose of the present invention is to provide a system and method of operating a light valve with a high intensity readout beam while mitigating the effects of light leakage through the device's mirror, and with an improvement in both readout contrast and resolution.

Another purpose is to provide a light valve system and method which can incorporate a metal matrix mirror, and yet can be used in the visible as well as infrared regions.

The invention is applicable to various types of light valves, including valves with either optical or CCD input mechanisms. The solution lies in operating the light valve with depletion periods, but pulsing the readout beam so that it interrogates the light valve only between depletion periods. Thus, although the pulsed beam can still leak into the valve's semiconductor layer, the leakage is restricted to inactive periods during which the light leakage does not materially degrade the system performance.

In one embodiment the light valve is operated with the semiconductor layer in alternating depletion and accumulation modes. In this situation the valve is interrogated by the readout beam substantially only during accumulation modes. If desired, the accumulation modes may be made longer than the intervening depletion modes; this is contrary to prior practice.

In another embodiment the light valve is operated in a cyclical pattern with the semiconductor material in depletion, accumulation and substantially quiescent periods during each cycle. The valve is interrogated with the readout beam substantially only during the quiescent period of each cycle, during which a substantially zero operating voltage may be applied to the valve. The quiescent period may either interrupt the depletion period, or be inserted between accumulation and depletion periods. It is preferably longer in duration than the accumulation period but shorter than the depletion period.

Applications for the invention include a standard type of light valve with an optical input, light valves employing a metal matrix mirror (with or without double Schottky contacts) and light valves with an input CCD array which receives an input electrical signal. The readout beam can be coordinated with the operating cycle for the valve by either controlling the beam in response to the operating voltage applied to the valve, or controlling the operating voltage in response to the readout beam.

Other features and advantages of the invention will be apparent to those skilled in the art from the following detailed description of preferred embodiments, taken together with the accompanying drawings, in which:

DESCRIPTION OF THE DRAWINGS

FIGS. 6a, 6b and 6c are graphs illustrating a conventional voltage pattern applied to a light valve, the resulting theoretical and practical capacitances established across the photoconductor layer, and the intensity of a corresponding input beam pixel, respectively;

FIGS. 7a and 7b are graphs of a voltage pattern and readout beam pulsing pattern, respectively, in accordance with the present invention;

FIG. 10 is a plan view of a light chopper wheel employed in the system of FIG. 9;

FIGS. 13a and 13b are respectively graphs of a prior voltage waveform used to operate the light valve of FIG. 12, and a voltage waveform in accordance with the invention for operating the same light valve;

FIGS. 15a, 15b and 15c are graphs of the applied voltage duty cycle employed with prior art systems, and with two embodiments of the invention, respectively.

DETAILED DESCRIPTION OF PREFERRED EMBODIMENTS

Figure 1:
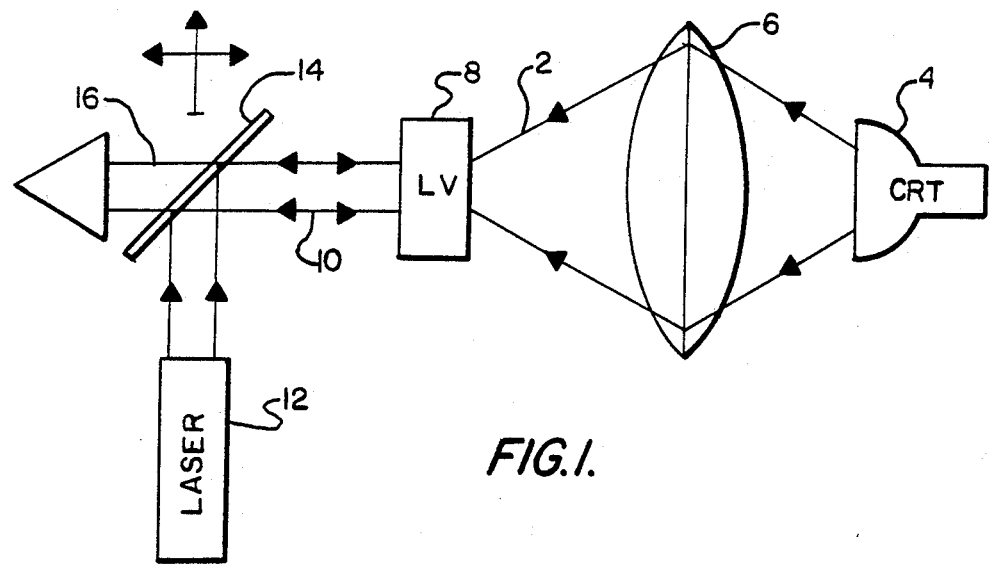
FIG. 1, described above, is a block diagram of a conventional light valve system.
Figure 2:
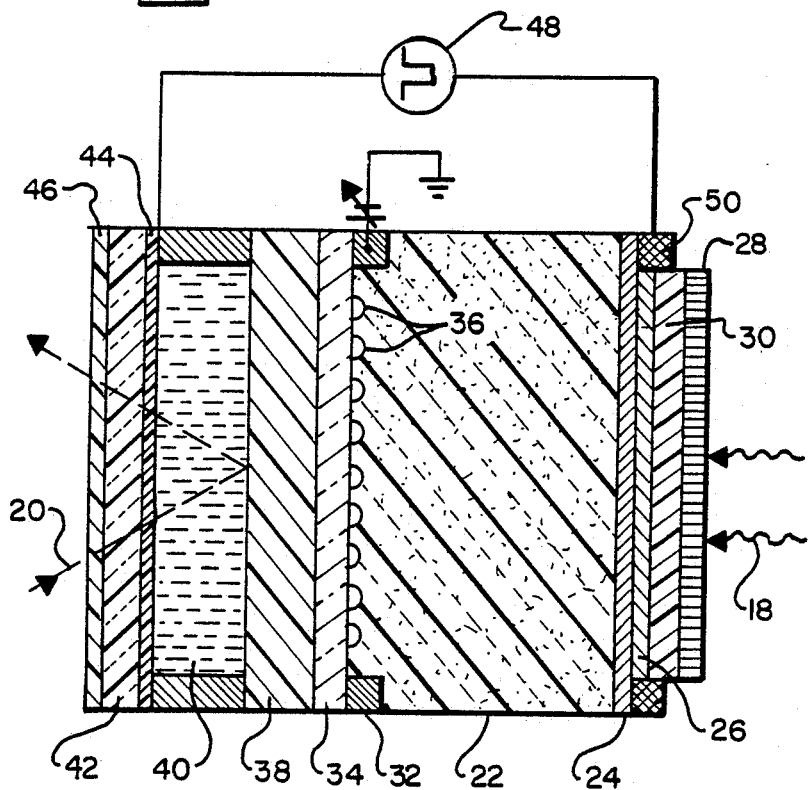
FIG. 2, described above, is a sectional view of a prior art liquid crystal light valve suitable for use in conjunction with the invention.
Figure 3:
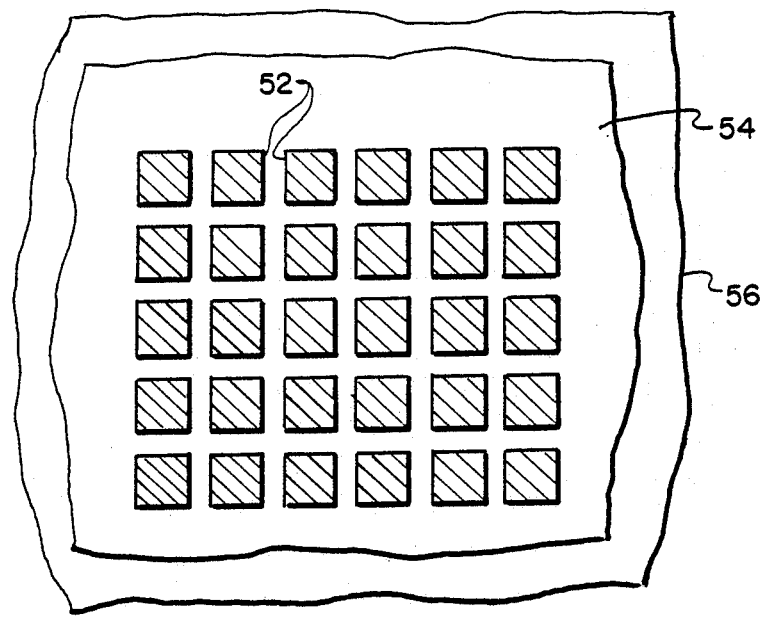
FIG. 3, described above, is a plan view of a metal matrix mirror structure.
Figure 4:
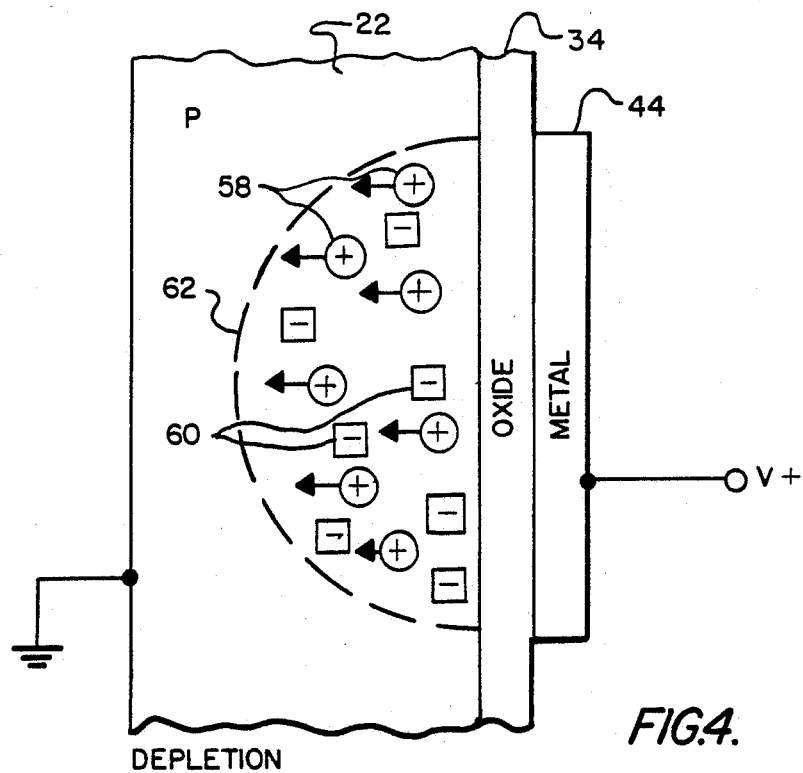
FIGS. 4 and 5 are greatly simplified drawings of the internal light valve MOS structure during depletion and accumulation phases, respectively.
Figure 5:
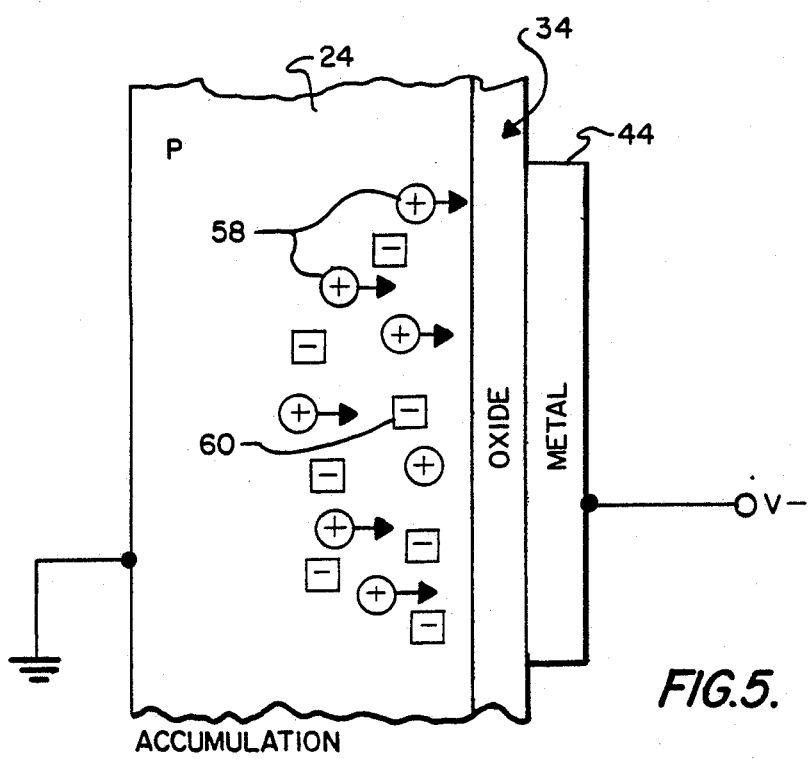

To understand the present invention, it is useful to briefly review the operation of a light valve MOS structure during depletion and accumulation. This operation is illustrated in FIGS. 4 and 5 for the back contact 24, gate oxide layer 34 and metallic electrode layer 44 of the light valve shown in FIG. 2. (For purposes of this patent application, the term "light" is intended to be understood in its broad sense as referring to all portions of the electromagnetic spectrum acceptable to a light valve, and not merely the visible or infrared regions.) The reference numerals employed in FIG. 2 are carried over to FIGS. 4 and 5 for common structural elements. layer 22 is a semiconductor which has either positive or negative doping; in the given example it is p-type silicon. This material is characterized by free positive charged holes 58, and fixed negative ions 60 which are imbedded in the crystal matrix. The holes move in response to a field created by a voltage applied to the metal electrode 44, while the imbedded ions generally remain fixed. The polarity of the fixed ions and free carriers is reversed for n-type material.

In the depletion phase illustrated in FIG. 4, which constitutes the main or active phase of prior art light valve operation, the gate electrode 44 is charged with voltage of the same polarity as that of the free carriers (i.e., positive gate voltage for p-type silicon). The majority carriers (holes) are pushed away from the oxide interface, leaving a depletion region indicated by dashed boundary line 62. Ideally, the depletion region should extend substantially all the way across the photoconductor layer.

FIG. 5 illustrates the accumulation phase, in which the gate electrode 44 is charged with a voltage of opposite polarity to that of the majority carriers This causes the majority carriers (holes for p-type material) to accumulate at the photoconductor/oxide interface. Minority carriers (electrons) which may be residing at the interface from the previous frame will be pushed toward the back contact 24, and will be re-combined with the majority carriers in the bulk p region.

Two phenomena occur that degrade the operation of the device in the depletion phase. First, there is a spontaneous creation of electron-hole pairs in the depletion region through "thermal generation". The electrons formed in this way drift toward the back side of the oxide layer, where they accumulate. This causes the depletion layer to gradually collapse as the electric field is restricted more and more to the oxide layer. Secondly, any light which may leak into the photoconductor layer 22 from the dielectric mirror/light blocking layer 38 creates additional electron-hole pairs above and beyond the thermal generation rate. If the light leakage is sufficiently great relative to the input light intensity, the extra electron-hole pairs resulting from light leakage through the dielectric mirror can overwhelm the effect of the low intensity input light. This will produce a rapid decay of the depletion region, and render the device practically inoperable.

A similar generation of electron-hole pairs occurs from light leakage through the dielectric mirror during the accumulation phase, illustrated in FIG. 5, but in this case there is no significant interference with the light valve operation. This is because, during accumulation, there is no depletion region and a large number of majority carriers are located in the area of the silicon/oxide interface. There are already a sufficient number of majority carriers present that the additional carriers resulting from light leakage through the dielectric mirror do not have any material effect on the light valve operation. The present invention makes use of this difference in depletion/accumulation operation by effectively restricting the interrogation of the light valve to the accumulation phase, during which light leakage is not harmful.

To further understand the invention, it will be helpful to summarize the conventional light valve operating cycle, which is illustrated in the graphs of FIGS. 6a, 6b and 6c. FIG. 6a illustrates the voltage applied to the gate electrode 44 for a p-type photoconductor layer. The applied voltage is set positive for relatively long periods to establish depletion phases 64, separated by the application of relatively short negative voltage pulses 66 to establish accumulation phases. The total period of the alternating signal is generally in the order of approximately 1 millisecond. Since in conventional light valves it is desirable to minimize the inactive (accumulation) period, the duration of the depletion intervals is typically on the order of about 100 times the duration of the accumulation intervals.

FIG. 6b illustrates the capacitance across a particular pixel location of the photoconductor layer resulting from the applied voltage pattern of FIG. 6a. The capacitance when readout light leakage through the dielectric mirror is ignored is indicated in solid lines, while the capacitance when readout light leakage is taken into consideration is indicated in dashed lines. The left side of FIG. 6b occurs when no input light is applied, while the right hand side results from the presence of input light; the intensity of the input light pixel for purposes of this illustration is shown in FIG. 6c.

With the input light off, the photoconductor capacitance is at a relatively high level 68 during accumulation periods. During the longer depletion periods, the photoconductor capacitance will theoretically fall to a significantly lower level 70 because the depletion region reduces the effective thickness of the photoconductor layer. However, under conditions of significant readout light leakage, the depletion phase capacitance will rapidly rise to a level 72, which is closer to the accumulation capacitance 68. This results from the collapse of the depletion region due to readout light induced majority carriers.

The effect of turning the input light pixel "on", indicated by step function 74 in FIG. 6c, is to shift more of the applied voltage onto the liquid crystal layer, at the expense of the voltage across the photoconductor layer. This produces a reduction in the width of the depletion region, and a corresponding increase in the capacitance of the photoconductor layer to level 76 (FIG. 6b) under ideal conditions. However, idealized level 76 may still be less than the light leakage capacitance level 72, in which case there would be no discernible difference in the photoconductor layer between "on" and "off" conditions for the input light. Even if the "on" idealized capacitance level 76 were greater than the "off" light leakage capacitance level 72, the light valve would display a much lower differential between "on" and "off" input conditions than it would in the absence of readout light leakage through the dielectric mirror. This is reflected as a marked decrease in readout contrast.

The present invention solves the dielectric mirror leakage problem in a unique manner. Instead of striving for further improvements in the mirror, which is a very difficult task, a new operating system for the light valve has been devised which accommodates leakage through the dielectric mirror by interrogating the light valve only when the light leakage does not interfere with its functioning. Specifically, while the input light and voltage supply are applied to the light valve continuously, the readout beam is pulsed so that it is applied to the light valve only during the accumulation phases of the MOS structure. It is during the accumulation phases that there are already so many majority carriers in the photoconductor that additional carriers from light leakage through the mirror does not have any significant effect.

This unique pulsing technique is illustrated in FIGS. 7a and 7b. In FIG. 7a, relatively short depletion voltage pulses 78 are interspersed between relatively long accumulation voltage pulses 80. It may be recalled that this is the reverse of the conventional voltage cycle, in which the depletion periods are much longer than the accumulation periods. Making the accumulation periods much longer with the present pulse technique is permissible because, with no readout beam during the active depletion region, there is no longer a need to minimize the inactive accumulation period.

Even though the readout beam is pulsed off periodically, there does not have to be a significant reduction in the time-averaged readout intensity as compared to a continuous readout interrogation with a beam having the same instantaneous intensity. For a pulse cycle rate of less than about 30 milliseconds (the eye's "flicker rate"), a person's eyes will average the readout beam intensity over time. By controlling the operation of the light valve so that the readout beam is applied during accumulation phases which are, say, 90% of the total cycle time, an increase of only about 10% will be necessary in the readout beam intensity to obtain the same average illumination as with non-pulsed operation.

FIG. 7b represents the intensity of the readout beam which is synchronized with the applied voltage The readout beam is "off" during relatively short periods 82 corresponding to the depletion periods, and "on" during longer periods 84 corresponding to the accumulation periods. The "off" periods for the readout beam deliberately overlap the depletion period slightly in time, to ensure that the readout beam is applied only during accumulation periods. By using a pulsed readout beam that is synchronized to coincide with the inactive (accumulation) phase of the operation of a light valve, the charged carriers produced by readout light leakage through the dielectric mirror do not contribute to the collapse of the deep depletion region during the active phase, nor to the signal-to-noise ratio.

The response time of the liquid crystal is much greater than the voltage and readout beam cycle rate, which is typically in the order of 1 millisecond. Thus, the liquid crystal orientation responds to the rms of the voltage across the liquid crystal layer. Accordingly, the liquid crystal will accurately control the reflection of the readout beam in a manner consistent with the input beam, despite the fact that the readout beam is applied only during the accumulation intervals when the photoconductor capacitance is the same regardless of the input light intensity.

In addition to improving readout contrast by mitigating the effect of light leakage through the dielectric mirror, the present invention also improves the resolution of the readout beam. This is because the preservation of the depletion region which results from pulsing the readout beam off during the depletion phases helps to sustain the electric field through the photoconductor layer. This in turn causes charge carriers to move directly across the photoconductor layer. If the field does not extend all the way across the layer, negative charge carriers will tend to drift away from a straight path until they enter the depletion region. This is avoided by the present invention's preservation of the depletion region.

Figure 8:
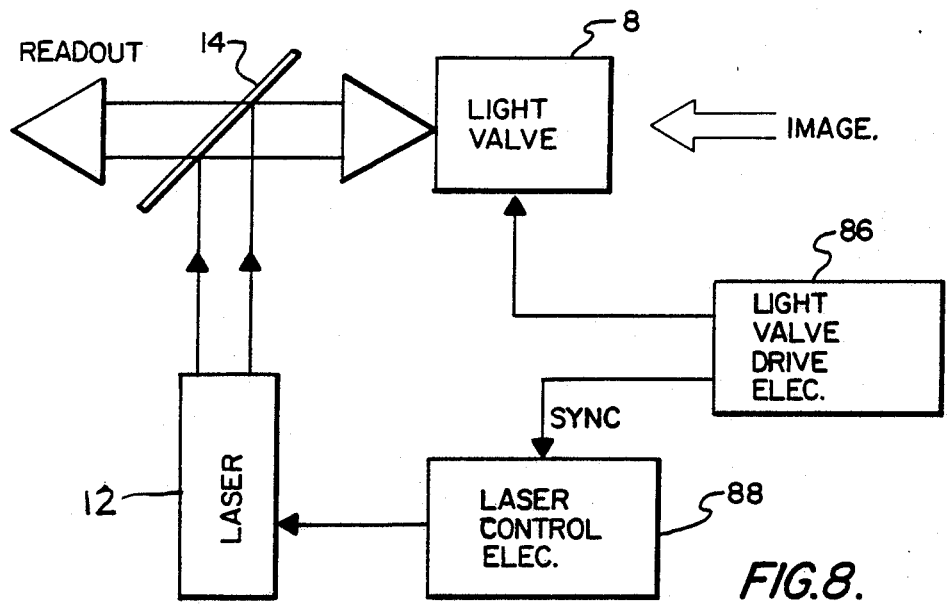
FIG. 8 is a block diagram illustrating one embodiment for implementing the present light valve system.

One system for implementing the invention is shown in FIG. 8. The alternating voltage is applied to the light valve 8 from suitable drive electronics 86, which also deliver a synchronizing pulse to the control electronics 88 for laser 12. Each time a voltage is applied to the light valve to operate it in an accumulation mode, a signal is delivered from the laser control electronics to turn the laser on. Conversely, the laser is turned off in response to the light valve drive electronics setting the light valve in a depletion mode.

Figure 9:
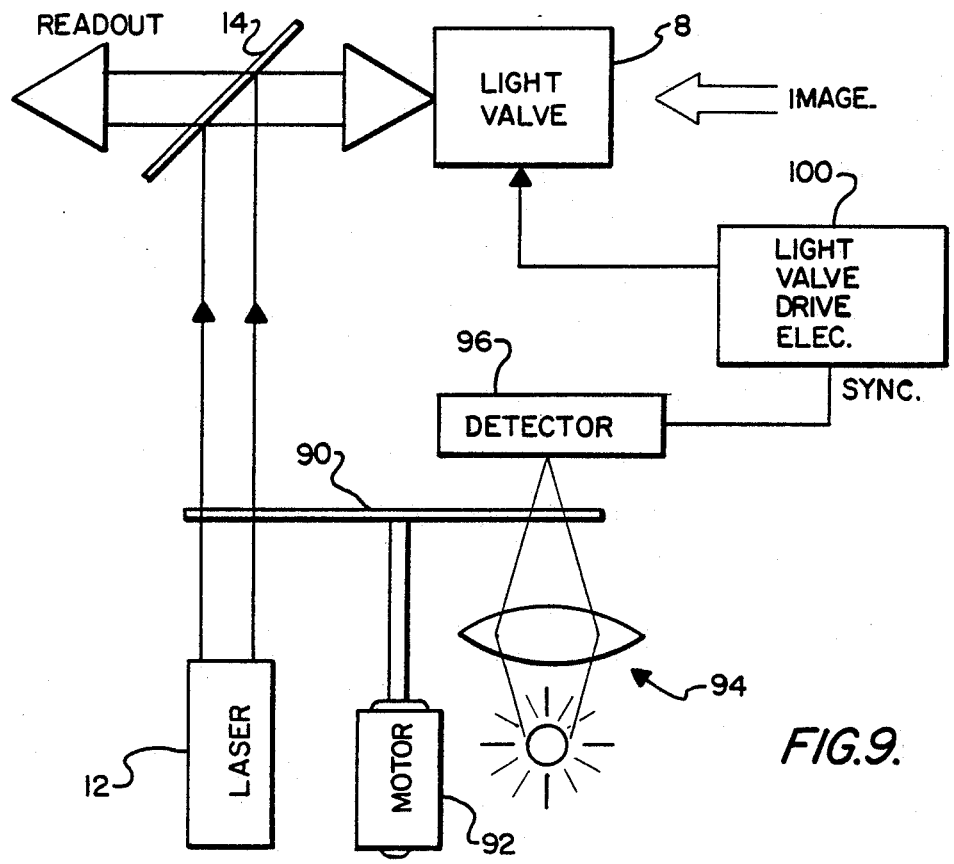
FIG. 9 is a block diagram of another embodiment for implementing the present light valve system.

Another system for implementing the invention is shown in FIG. 9. In this embodiment the readout beam from laser 12 is directed through a chopper wheel 90, illustrated in FIG. 10, before reaching polarizing beam splitter 14. Chopper wheel 90 is driven by a rotary motor 92, and its angular orientation is monitored by means of a light source 94 on one side of the wheel and an aligned photodetector 96 on the opposite side of the wheel. The wheel includes a series of blocking spokes 98 which periodically blank the readout beam as the wheel rotates. The light source 94 and photodetector 96 are positioned relative to the chopper wheel 90 and laser 12 such that a synchronizing signal is delivered to the light valve drive electronics 100 each time the readout beam is blanked or unblanked by the wheel. The drive electronics respond to the photodetector signal by applying an alternating voltage to the light valve that sets the valve in a depletion mode only when the readout beam is blanked.

The illustrated system and method have numerous applications, such as in visual displays, optical data processing and infrared applications. The system could be implemented with an n-type photoconductor simply by reversing the polarity of the voltage applied to the electrode.

Figure 11:
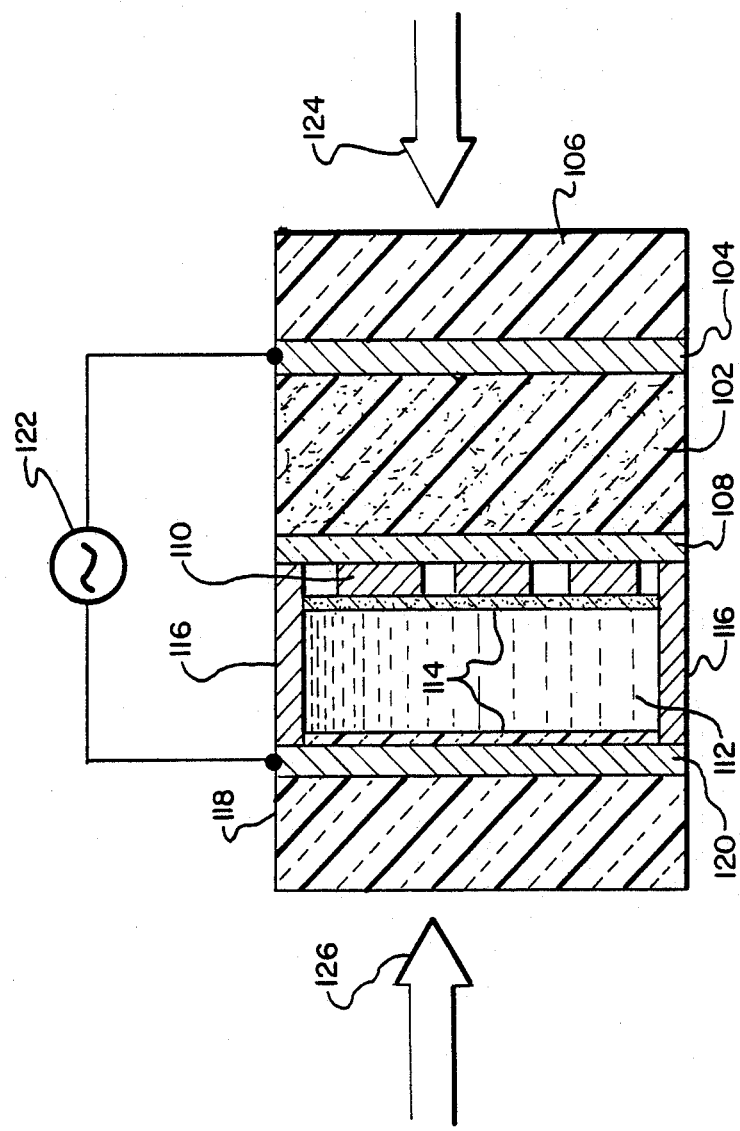
FIG. 11 is a sectional view of a light valve which employs a metal matrix mirror and may be operated in accordance with the invention.

The invention is applicable to light valves employing a metal matrix mirror, and expands the useful range of such devices into the visible light regime. The internal construction of a silicon-based liquid crystal light valve employing a metal matrix mirror is shown in FIG. 11. The device consists of a layer of high resistivity silicon (previously cadmium sulfide) photoconductor 102 coupled on its input side to an electrode 104, preferably formed from a boron diffusion implant or ITO. A Schottky contact is thus formed between the electrode 104 and photoconductor layer 102. A transparent face plate 106 provides mechanical support and electrical isolation for electrode 104 on the opposite side from photoconductor 102. The face plate can be formed from various materials, such as optical quality glass or an array of optical fiber waveguide segments.

An oxide layer 108 is formed on the opposite side of photoconductor layer 102 from electrode 104, with metal matrix mirror 110 having metal islands facing away from the photoconductor. On the readout (left) side of the metal matrix mirror is a layer of fast response, positive anisotropy, 45° twisted-nematic liquid crystal 112 which is employed as the light modulator. The liquid crystal is contained on each side by insert insulating layers 114, and around its periphery by a spacer 116. Other configurations for the liquid crystal could also be used, as is known in the art. On the readout side of the liquid crystal cell a front transparent face plate 118 has a coating of indium tin oxide to form counter electrode 120 adjacent the cell. The front of face plate 118 is coated with an anti-reflection coating, and the whole structure is assembled within an airtight anodized aluminum holder. The operation of the device is similar to that of the dielectric mirror light valve shown in FIG. 2.

The metal matrix mirror light valve is operated with a voltage pattern and pulsed readout beam of the type indicated in FIGS. 7a and 7b. Although significant portions of the readout beam leak through the mirror between the reflective metal islands, this leakage is restricted to the accumulation periods when it does no substantial harm.

Figure 12:
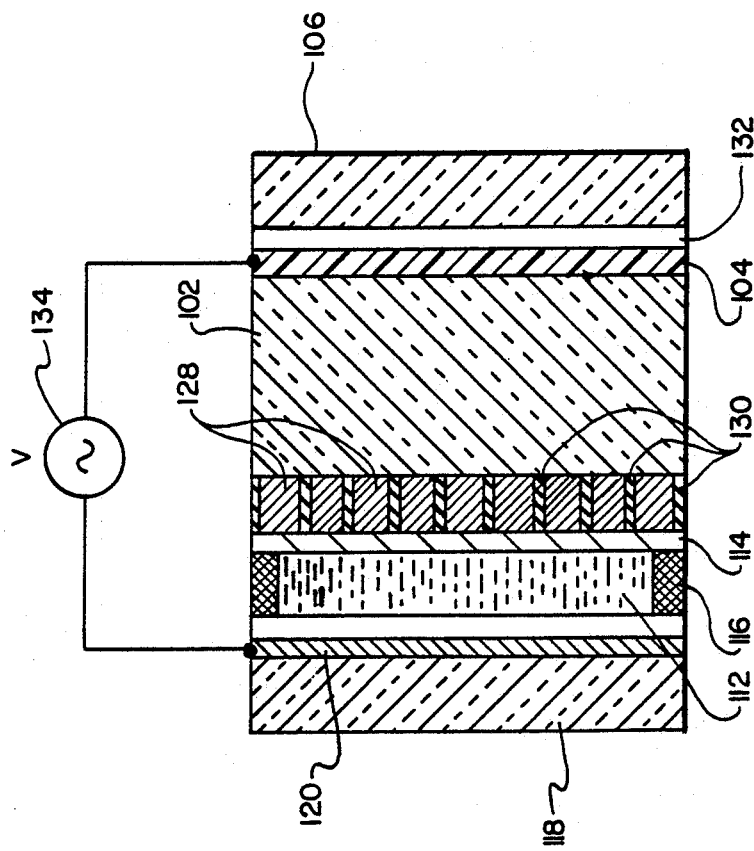
FIG. 12 is a sectional view of a double-Schottky metal matrix mirror light valve which can be operated in another embodiment of the invention.

Another embodiment of the invention is employed for a double-Schottky diode light valve of the type disclosed in co-pending patent application Ser. No. 758,917, "Double-Schottky Diode Liquid Crystal Light Valve", filed on July 25, 1985 by Paul O. Braatz and Uzi Efron and assigned to Hughes Aircraft Company, the assignee of the present invention. In this embodiment Schottky contacts are disposed on opposite sides of the photoconductor layer, and are operated to maintain the photoconductor substantially depleted of photogenerated majority carriers. The light valve is illustrated in FIG. 12, with common reference numerals used for elements that are common with the light valve shown in FIG. 11. In this embodiment the metallic islands 128 which comprise the metal matrix mirror extend all the way through the mirror substrate, leaving only a grid pattern 130 for the substrate. An array of Schottky diode contacts is thus formed between the metallic mirror elements 128 and the semiconductive photoconductor layer 102. On the opposite side of the photoconductor layer, its direct contact with metallic electrode 104 forms another Schottky diode contact; a transparent cement 132 holds face plate 106 to the electrode 104. A voltage source 134 applies a voltage waveform across the electrode 104 and counter electrode 120 that is uniquely tailored to this double-Schottky device The double-Schottky light valve discussed in the Braatz-Efron application operates with a substantially symmetrical square wave voltage signal 136, illustrated in FIG. 13a. Due to the presence of Schottky contacts on both sides of the photoconductor layer, the device is continually operated in a depletion mode, with the depletion region extending from one Schottky contact or the other in accordance with the applied voltage polarity.

To accommodate the double-Schottky device to the present invention, the applied voltage pattern is modified to the waveform 138 illustrated in FIG. 13b. In this waveform, positive pulses 140 are alternated with substantially symmetrical negative pulses 142. Separating each pulse is a brief inactive or quiescent period 144, during which the applied voltage is substantially zero. The readout beam, indicated by arrow 146, is pulsed on during these brief quiescent intervals and pulsed off during the remainder of the waveform. In this manner, readout is again restricted to the portion of the light valve cycle during which the photoconductor layer is not in a depletion mode, and readout light leakage through the metal matrix mirror again does not substantially impair the operation of the light valve. For a 1 millisecond voltage cycle, the duration of the positive and negative voltage pulses 140 and 142 can typically be about 0.4 milliseconds each, with the inactive period lasting for about 0.2 milliseconds.

The invention is also applicable to a CCD light valve. In this type of device an electronic input signal in the form of serially coded data is transformed to a spatial polarization of a liquid crystal layer within the valve, and this layer controls the reflection of a readout beam from the valve. The portions of the readout beam which are incident upon locations in the liquid crystal layer that have been appropriately polarized are reflected back to emerge as an encoded output beam.

Figure 14:
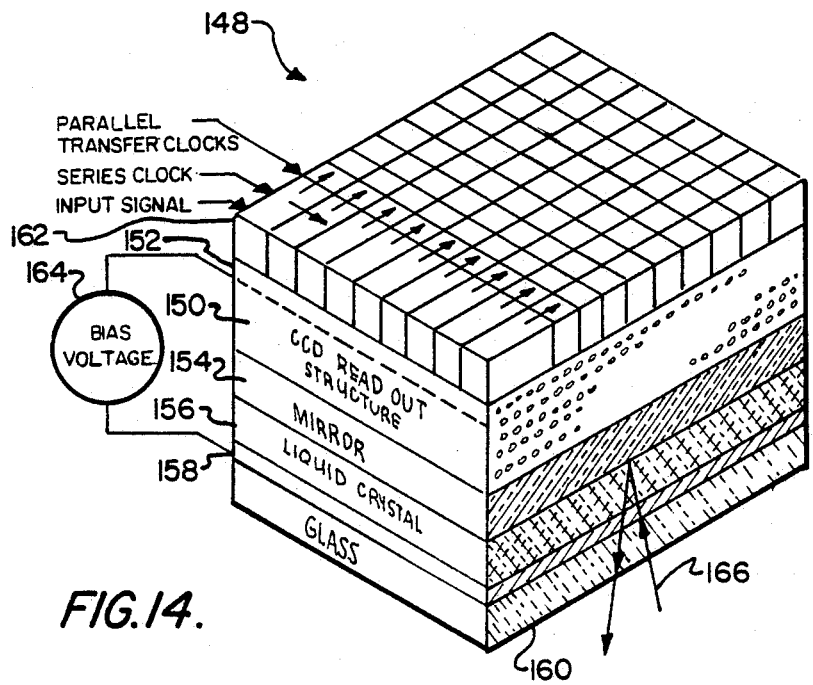
FIG. 14 is an illustrative diagram of a CCD light valve suitable for use with the invention.

The internal construction of a CCD light valve is illustrated in FIG. 14. It includes a CCD array 148 on the input side of the device, a semiconductor layer 150, generally silicon, below the CCD layer with a thin epitaxial layer 152 in the semiconductor adjacent the CCD array in which the CCD is fabricated, a mirror 154 below the semiconductor, a liquid crystal layer 156 below the mirror, a transparent electrode 158 below the liquid crystal, and a glass face plate 160 on the readout side of the device adjacent the transparent electrode.

The CCD circuit converts serially encoded data received at input port 162 into a two-dimensional frame of information which is stored as charged packets in the CCD array. Initially, one line of information is loaded into the CCD serial input register (x register) 162. When this register is fully loaded, the line of information is transferred in parallel to the CCD parallel array (in the y direction). Next, the serial input register 162 is again filled with a new line of information. Then the first line of information is shifted one step downward in the parallel array, while the second line of information is simultaneously transferred from the input register into the first stage of the parallel CCD array. This sequence is repeated until the parallel array contains an entire frame of information. At this point, the whole frame is transferred simultaneously via the semiconductor layer into the liquid crystal layer as a spatially resolved pattern of voltage modulation. This is accomplished under the control of a voltage source 164, which establishes a potential between the thin epitaxial layer 152 and the transparent electrode 158.

The frame of information in the CCD array is transferred by simultaneously biasing the parallel CCD array gates into accumulation, thus releasing the stored charge packets. The spatial pattern of electron charges diffuses through the thin epitaxial layer 152, and is subsequently collected by the electric field in the space-charged region of the fully depleted semiconductor substrate 150. The modulation is temporarily stored in the liquid crystal layer 156 while a new frame of information is being loaded into the CCD parallel array. Optical readout from the device is accomplished by passing a polarized light beam 166 through the transparent electrode 158 and the liquid crystal layer 156. The beam is then reflected by the mirror 154 and passed back through the liquid crystal layer. When the liquid crystal layer is activated by a sufficient current signal, the optical polarization vector of the readout beam is rotated in direct proportion to the degree of local electrical activation. Thus, a spatially resolved pattern of polarization modulation is introduced onto the reflected readout light beam. This pattern of polarization modulation can then be converted into an intensity-modulated output image by using a polarizing beam splitter, or separate analyzer.

The device includes two full-frame storage means: the CCD array, and the liquid crystal. This enables the use of the CCD storage to convert the serial input information to a parallel form, and for the subsequent transfer of the whole frame in parallel to the liquid crystal and the optical processor. This is important for coherent optical data processing, which requires that all image elements be presented simultaneously.

In contrast to the photoactivated LCLV where the photocharge is continuously injected, in the CCD-LCLV the signal charge is injected during a short pulse. The combined effects of the longer frame period (10 ms compared with less than 1 ms) and pulsed charge injection in the CCD device have a significantly different effect on its liquid crystal behavior as compared with the photoactivated case. Time resolved studies have indicated that the narrow, high amplitude accumulation pulse causes a sharp activation of the liquid crystal, which is then followed by a long relaxation of the liquid crystal molecules. Effectively, the charge-injected output of the CCD-LCLV decreases rapidly with the onset of accumulation, to the level of a relatively high intensity dark state.

A modified voltage waveform which is coordinated with a pulsed readout beam to eliminate the problems of readout light passing through the gaps of a metal matrix mirror in a CCD light valve, while permitting a sufficiently long sampling period (on the order of 10 milliseconds) of the liquid crystal "on" state signal, is illustrated in FIGS. 15a, 15b and 15c. FIG. 15a shows the typical prior art voltage waveform used. The voltage level alternates between relatively long depletion levels 168, and much shorter accumulation pulses 170. This waveform is modified in accordance with the invention by inserting an inactive, or quiescent, period during which the voltage is set to zero; the readout beam is pulsed on during the quiescent period, and held off during the remainder of the voltage cycle. During the quiescent period, which has a duration in the order of a few milliseconds, electrons are not driven in any particular direction because of the lack of an applied field.

The quiescent period 172 may be inserted during an interruption of the depletion period, as illustrated in FIG. 15b, or it may occur between the depletion and accumulation periods, as indicated in FIG. 15c. In either case, the pulsing of the readout beam is restricted to the quiescent period; this pulsing is indicated by arrow 174 in FIGS. 15b and 15c. If the quiescent period occurs between depletion and accumulation pulses, it should immediately precede the accumulation pulse, since the CCD array outputs charge shortly after the completion of the accumulation period. The quiescent period is longer than the accumulation period but shorter than the depletion period, and generally extends for about 250–2,500 microseconds.

While several different embodiments of a unique pulsed readout technique have thus been shown and described, numerous variations and alternate embodiments will occur to those skilled in the art. For example, the modulating input to the light valve could be an electron beam, or some other input mechanism which cooperates with the light valve's semiconductor layer to establish a spatial voltage pattern for modulating the readout beam. It is therefor intended that the invention be limited only in terms of the appended claims.

We claim:

1. A light valve system, comprising:

a light valve adapted to spatially modulate a readout beam in accordance with an applied input signal, the light valve including a layer of semiconductor material which produces a spatial voltage pattern in response to the input signal, the semiconductor material being capable of operation in alternating accumulation and depletion mode, an oxide layer adjacent aid semiconductor material, a reflective mirror adjacent said oxide layer for reflecting the readout beam, and a layer of electro-optic material adjacent said reflective mirror, the electro-optic material for receiving the voltage pattern from the semiconductor layer and spatially modulating the readout beam in response to said voltage pattern, means for applying an alternating voltage signal to operate the light valve with the semiconductor material in alternating repletion and accumulation modes, and means for interrogating the light valve with a pulsed readout beam applied in synchronization with the applied alternating voltage so that the light valve is interrogated substantially only during accumulation modes, thereby mitigating the effect of readout beam leakage into the semiconductor material.

2. The light valve system of claim 1, wherein said means for applying the alternating voltage operates the light valve in accumulation modes which are longer than the intervening depletion modes.

3. A light valve system, comprising:
a light valve adapted to spatially modulate a readout beam in accordance with an applied input signal, the light valve including a layer of semiconductor material which produces a spatial voltage pattern in response to the input signal, the semiconductor material being capable of operating in a depletion mode, and a layer of electro-optic material which receives the voltage pattern from the semiconductor layer and spatially modulates the readout beam in response to said voltage pattern;

voltage applying means for applying an alternating voltage signal to operate the light valve with the semiconductor layer in time-spaced depletion periods, wherein the voltage applying means is adapted to operate the light valve in a cyclical pattern with the semiconductor material in depletion, accumulation and substantially quiescent periods during each cycle, and interrogating means for interrogating the light valve with a pulsed readout beam substantially only between depletion periods during the quiescent period thereby mitigating the effect of readout beam leakage into the semiconductor layer.

4. The light valve system of claim 3, wherein the voltage applying means is adapted to apply voltages of opposite polarity to the light valve during the depletion and accumulation periods, respectively, and a substantially zero voltage during the quiescent periods, and the interrogating means is adapted to apply a readout beam to the light valve substantially only during the quiescent period of each cycle.

5. The light valve system of claim 3, wherein the voltage applying means is adapted to establish the quiescent period of each cycle during an interval of the depletion period which is time-spaced from the accumulation period.

6. The light valve system of claim 3, wherein the voltage applying means is adapted to establish the quiescent period of each cycle between depletion and accumulation periods.

7. The light valve system of claim 3, wherein the voltage applying means is adapted to establish a quiescent period of each cycle which is longer in duration than the accumulation period but shorter than the depletion period.

8. The light valve system of claim 7, wherein the quiescent period of each cycle is about 250–2,500 microseconds.

9. The light valve system of claim 1, including a pair of transparent electrodes which sandwich the semiconductor material and electro-optic layer, and wherein the semiconductor material is a photoconductor, and the means for applying an alternating voltage signal operates the light valve with the photoconductor in an accumulation mode for longer periods of time than in a depletion mode.

10. The light valve system of claim 9, wherein an insulative oxide layer is disposed between the photoconductor and the transparent electrode adjacent to the photoconductor.

11. The light valve system of claim 9 wherein said mirror comprises a metal matrix mirror.

12. A light valve system, comprising:
a light valve adapted to spatially modulate a readout beam in accordance with an applied input signal, the light valve including:
a semiconductor layer which produces a spatial voltage pattern in response to the input signal, said semiconductor layer formed from a photoconductor material and adapted to receive an input optical beam and capable of operating in a depletion mode;
an electro-optic layer of electro-optic material which receives the voltage pattern from the semiconductor layer and spatially modulates the readout beam in response to the voltage pattern;
a pair of transparent electrodes sandwiching said electro-optic layer and said semiconductor layer, said pair connected so as to receive the applied voltage, wherein one transparent electrode of said air is in direct contact with the semiconductor layer and forms a first Schottky contact therewith; and
a metal matrix mirror on the readout side of said semiconductor layer for reflecting readout radiation, the metal matrix mirror forming a series of second Schottky contacts with the semiconductor layer;

voltage applying means for applying an alternating voltage signal across the electrodes to operate the light valve with the semiconductor layer in time-spaced depletion periods, with substantially equal positive and negative voltage pulses separated by quiescent periods, and interrogating means for interrogating the light vlave with a pulsed readout beam substantially only between depletion periods during said quiescent periods, thereby mitigating the effect of readout beam leakage into the semiconductor layer.

13. A light valve system comprising:
a light valve adapted to spatially modulate a readout beam in accordance with an applied input signal, the light vlave including:
a layer of semiconductor material which produces a spatial voltage pattern in response to the input signal, the semiconductor material being capable of operating in a depletion mode;

a layer of electro-optic material which receives the voltage pattern from the semiconductor layer and spatially modulates the readout beam in response to said voltage pattern;

an input charge-coupled device array adapted to receive an input electrical signal, and a mirror which reflects a readout beam transmitted through the electro-optic layer back through said electro-optic layer, the semiconductor layer modulating the electro-optic layer in response to the data in the CCD array;

voltage applying means for applying a cyclical operating voltage to the light valve to operate the light valve with the semiconductor material in time-spaced depletion periods with depletion, accumulation and quiescent periods during each voltage cycle, and interrogating means for interrogating the light valve with a pulsed readout beam substantially only between depletion periods during the quiescent period of each cycle, thereby mitigating the effect of readout beam leakage into the semiconductor layer.

14. The light valve system of claim 13, wherein the mirror comprises a metal matrix mirror.

15. The light valve system of claim 13, wherein the electro-optic material consists of nematic liquid crystals.

16. The light valve system of clam 13, wherein the interrogating means is responsive to the operating voltage applied to the light valve to control the readout beam.

17. The light valve system of claim 13, wherein the voltage applying means is responsive to the interrogating means to coordinate the operating voltage with the readout beam.

18. A method of operating a light valve, the light valve including a layer of semiconductor material which produces a spatial voltage pattern in response to the input signal, the semiconductor material being capable of operation in alternating accumulation and depletion mode, an oxide layer adjacent said semiconductor material, a reflective mirror adjacent said oxide layer for reflecting a readout beam, and a layer of electro-optic material for receiving the voltage pattern from the semiconductor layer and spatially modulating the readout beam in response to said voltage pattern, the method comprising:

applying a voltage signal to operate the light valve in alternating accumulation and depletion modes, and interrogating the light valve with a pulsed readout beam substantially only during accumulation modes.

19. The method of claim 18, wherein the operating voltage operates the light valve in accumulation modes which are longer than the intervening depletion modes.

20. A method of operating a light valve including a layer of semiconductor material which produces a spatial voltage pattern in response to an input signal, and a layer of electro-optic material which receives the voltage pattern form the semiconductor layer and spatially modulates a readout beam in response thereto, comprising:

applying an operating voltage signal to operate the light valve in a cyclical pattern with the semiconductor material in depletion, accumulation and substantially quiescent periods during each cycle, and interrogating the light valve with a pulsed readout beam substantially only during the quiescent period of each cycle between depletion periods, thereby mitigating the effect of readout beam leakage into he semiconductor layer.

21. The method of claim 20, wherein operating voltages of opposite polarities are applied to the light valve during the depletion and accumulation periods, a substantially zero voltage is applied to the light valve during the quiescent periods, and the light valve is interrogated by the readout beam substantially only during the quiescent period of each cycle.

22. The method of claim 20, wherein the operating voltage establishes the quiescent period of each cycle during an interval of the depletion period which is time-spaced from the accumulation period.

23. The method of claim 20, wherein the operating voltage establishes the quiescent period of each cycle between depletion and accumulation periods.

24. The method of claim 20, wherein the operating voltage establishes a quiescent period of each cycle which is longer in duration than the accumulation period but shorter than the depletion period.

25. The method of claim 24, wherein the quiescent period of each cycle is about 250–2,500 microseconds.

26. The method of claim 20, wherein the light valve includes an input charge-coupled device (CCD) array adapted to receive an input electrical signal, and a mirror which reflects a readout beam transmitted through the electro-optic layer back through the electro-optic layer, and wherein the electro-optic layer is modulated by the semiconductor layer in response to the data in the CCD array.

27. The method of claim 26 wherein the electro-optic material consists of nematic liquid crystals.

28. The method of claim 26 wherein the interrogation of the light valve with a readout beam is controlled in response to the operating voltage applied to the light valve.

29. The method of claim 26, wherein the operating voltage is controlled in response to the interrogation of the light valve with a readout beam, to coordinate the operating voltage with the beam.

30. A light valve system comprising:

a liquid crystals light valve including a layer of semiconductor material and operable continually in a depletion mode;

means for cyclically applying symmetric voltage pulses of opposite polarity to operate the liquid crystal light valve with substantially zero voltage applied between the pulses;

means for applying a pulsed readout beam to interrogate the light valve substantially only during the zero voltage period of each cycle, thereby mitigating the effect of readout beam leakage into semiconductor material.

* * * * *

UNITED STATES PATENT AND TRADEMARK OFFICE
CERTIFICATE OF CORRECTION

PATENT NO. : 4,807,976
DATED : February 28, 1989
INVENTOR(S) : M.J. Little et al It is certified that error appears in the above-identified patent and that said Letters Patent is hereby corrected as shown below:

Column 13, line 8, "aid" should be --said--.

Column 14, line 44, "air" should be --pair--.

Column 14, line 66, "vlave" should be --valve--.

Column 15, line 7, after "device" insert --(CCD)--.

Column 15, line 60, after "valve" insert --, the light valve--.

Column 15, line 64, "form" should be --from--.

Column 16, line 12, "he" should be --the--.

Signed and Sealed this

Twenty-sixth Day of December, 1989

*Attest:*

JEFFREY M. SAMUELS

*Attesting Officer*     *Acting Commissioner of Patents and Trademarks*